United States Patent
Jing et al.

(10) Patent No.: US 12,461,617 B2
(45) Date of Patent: Nov. 4, 2025

(54) TOUCH DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Yangzhong Jing, Beijing (CN); Chengchung Yang, Beijing (CN); Yucheng Chan, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/029,368

(22) PCT Filed: Jun. 1, 2022

(86) PCT No.: PCT/CN2022/096700
§ 371 (c)(1),
(2) Date: Mar. 29, 2023

(87) PCT Pub. No.: WO2023/230967
PCT Pub. Date: Dec. 7, 2023

(65) Prior Publication Data
US 2024/0427443 A1    Dec. 26, 2024

(51) Int. Cl.
*G06F 3/041* (2006.01)
(52) U.S. Cl.
CPC .................... *G06F 3/0412* (2013.01)

(58) Field of Classification Search
CPC .... G06F 3/0412; G06F 3/041; G06F 3/04164; G06F 3/0443; G09F 9/33; H10D 86/00
See application file for complete search history.

(56) References Cited

U.S. PATENT DOCUMENTS 12,075,654 B2 *   8/2024   Heo ..................... H10K 50/841
12,153,769 B2 *  11/2024   Zheng ................... G06F 3/0412
(Continued)

FOREIGN PATENT DOCUMENTS

CN    103885659 A    6/2014
CN    108183122 A    6/2018
(Continued)

OTHER PUBLICATIONS

PCT/CN2022/096700 international search report.

*Primary Examiner* — Bryan Earles
(74) *Attorney, Agent, or Firm* — IPro, PLLC (57) ABSTRACT

The present disclosure relates to a touch display panel and a display apparatus. The touch display panel includes a touch region and a switching region, where the touch region provided with a light-emitting structure is adjacent to the switching region. The touch display panel includes: a substrate, a trace where at least part of the trace is located in the switching region on the substrate, a touch signal line, located at a side of the trace away from the substrate, and a touch connection line, electrically connected with the touch signal line and disposed in a different layer from the trace and the touch signal line. In a direction perpendicular to the substrate, the touch connection line is overlapped with at least partial edge of the trace. According to the embodiments of the present disclosure, large-area short-circuiting on the display panel can be avoided.

20 Claims, 7 Drawing Sheets

(56) References Cited

U.S. PATENT DOCUMENTS

| | | | |
|---|---|---|---|
| 2013/0106739 A1* | 5/2013 | Lee | G06F 3/0443 |
| | | | 345/173 |
| 2013/0161177 A1 | 6/2013 | Lee et al. | |
| 2014/0184952 A1* | 7/2014 | Chu | G06F 3/0443 |
| | | | 349/12 |
| 2015/0169105 A1 | 6/2015 | Tung | |
| 2019/0386069 A1 | 12/2019 | Feng | |
| 2020/0125199 A1 | 4/2020 | Feng | |
| 2020/0401274 A1* | 12/2020 | Moon | G06F 3/0445 |
| 2021/0223940 A1* | 7/2021 | Li | G06F 3/04164 |
| 2022/0057900 A1 | 2/2022 | Xiang et al. | |
| 2022/0075472 A1* | 3/2022 | Liang | G06F 1/1626 |
| 2022/0113854 A1 | 4/2022 | He et al. | |
| 2022/0320239 A1 | 10/2022 | Wei et al. | |
| 2023/0024214 A1 | 1/2023 | Tong et al. | |
| 2024/0019960 A1* | 1/2024 | Yang | G06F 3/0412 |
| 2024/0032350 A1* | 1/2024 | Ye | G06F 3/04164 |

FOREIGN PATENT DOCUMENTS

| | | | |
|---|---|---|---|
| CN | 108572474 A | 9/2018 | |
| CN | 109616480 A | 4/2019 | |
| CN | 111782089 A | 10/2020 | |
| CN | 113161401 A | 7/2021 | |
| CN | 113206139 A | 8/2021 | |
| CN | 113767475 A | 12/2021 | |
| WO | 2021120164 A1 | 6/2021 | |
| WO | 2021217614 A1 | 11/2021 | |

* cited by examiner

TOUCH DISPLAY PANEL AND DISPLAY APPARATUS

CROSS-REFERENCE TO RELATED APPLICATIONS

This application is a national stage of international PCT Application No. PCT/CN2022/096700, filed on Jun. 1, 2022, the entire contents of which are incorporated herein by reference.

TECHNICAL FIELD

The present disclosure relates to the field of display technologies, and in particular to a touch display panel and a display apparatus.

BACKGROUND

In the related arts, along with continuous development of technologies, the display panel technologies gradually develop toward integration and people have higher requirements for screen thickness and bezel width.

In the flexible multilayer on cell (FMLOC) technology, flexible display touch is integrated into an encapsulation layer of a display panel, eliminating the need of hanging a touch panel externally. But, the display panels adopting FMLOC technology are liable to large-area short-circuiting.

SUMMARY

The present disclosure provides a touch display panel and a display apparatus so as to address all or part of defects in the related arts.

According to a first aspect of embodiments of the present disclosure, there is provided a touch display panel, including a touch region and a switching region. The touch region and the switching region are adjacent to each other, and the touch region is provided with a light-emitting structure;
the touch display panel includes:
a substrate;
a trace, where at least part of the trace is located in the switching region on the substrate;
a touch signal line, located at a side of the trace away from the substrate;
a touch connection line, electrically connected to the touch signal line, and disposed in a different layer from the trace and the touch signal line; where in a direction perpendicular to the substrate, the touch connection line is overlapped with at least partial edge of the trace.

From the above embodiments, it can be known that, the touch connection line is electrically connected to the touch signal line and overlapped with at least partial edge of the trace, such that the length of the touch signal line can be shortened so as to increase its anti-bending capability. Further, it may be possible to avoid that, after the touch signal line is bent, contact between the touch signal line and the trace results short-circuiting. Further, when the length of the touch signal line is shortened, the touch signal line may stay away from the part where the formation anomaly of the insulation material may easily occur at the edge of the trace. In this way, it may be possible to avoid the short-circuiting resulting from contact between the touch signal line and the abnormally-formed part of the insulation material of the trace. Since the short-circuiting resulting from abnormal contact between the touch signal line and the trace is avoided by the above improvements, it may be possible to avoid the short-circuiting between the touch signal line and the trace, and influence on the other adjacent touch signal lines caused by the short-circuiting between the touch signal line and the trace.

In some embodiments, the touch connection line includes a first switching line, which is located in the switching region and located between the substrate and the trace;
hollow portions are disposed on the trace and the hollow portions are hollow parts of the trace; the first switching line is electrically connected to the touch signal line, and a projection of a part of the first switching line in electrical connection with the touch signal line on the substrate is located within a projection of a hollow portion of the hollow portions on the substrate.

In some embodiments, the touch display panel further includes a bending region, where the bending region is located at a side of the switching region away from the touch region, and parts distributed in the bending region are configured to bend to a non-light-emitting side of the touch display panel; the touch display panel further includes a touch transmission line which is partially located in the bending region and in electrical connection with the touch connection line.

In some embodiments, the touch transmission line and the trace are located in a same layer.

In some embodiments, the touch transmission line and the trace are located in different layers.

In some embodiments, the touch connection line further includes a second switching line which is located in the switching region and located in the same layer as the trace; a projection of the second switching line on the substrate is located within the projection of the hollow portion on the substrate and outside the projection of the trace on the substrate;
an end of the second switching line is electrically connected to the touch signal line, other end of the second switching line is electrically connected to the first switching line, and the first switching line is electrically connected to the touch signal line through the second switching line.

In some embodiments, the second switching line and the trace are located in a same layer, and the second switching line is a part separated from the trace when the hollow portions are formed on the trace.

In some embodiments, the second switching line and the trace are located in different layers.

In some embodiments, the touch display panel further includes: a first gate layer, a second gate layer, a first source-drain layer, a second source-drain layer and an encapsulation layer that are sequentially stacked on the substrate;
the touch signal line is located at a side of the encapsulation layer away from the substrate, where the trace and the first source-drain layer are disposed in a same layer;
the second switching line and the second source-drain layer are disposed in a same layer.

In some embodiments, the touch display panel further includes: a storage capacitor, located between the substrate and the trace; where the storage capacitor includes first gate layer and second gate layer that are opposite to each other, and the first gate layer is located between the second gate layer and the substrate;
the first switching line is disposed in a same layer as the first gate layer or the second gate layer.

In some embodiments, the touch connection line further includes a first switching line located in the switching region;
 the first switching line is located between the touch signal line and the trace; the trace is provided with hollow portions which are hollow parts of the trace; the first switching line is electrically connected to the touch signal line, and a projection of a part of the first switching line in electrical connection with the touch signal line on the substrate is located within the projection of a hollow portion of the hollow portions on the substrate.

In some embodiments, the touch display panel further includes a bending region, where the bending region is located at a side of the switching region away from the touch region and parts distributed in the bending region are configured to bend to a non-light-emitting side of the touch display panel; the touch display panel further includes a touch transmission line which is partially located in the bending region and electrically connected to the touch connection line;
 the touch transmission line and the trace are located in a same layer.

In some embodiments, the touch display panel further includes a first gate layer, a second gate layer, a first source-drain layer, a second source-drain layer and an encapsulation layer that are sequentially stacked on the substrate;
 the touch signal line is located at a side of the encapsulation layer away from the substrate, wherein the trace and the first source-drain layer are located in a same layer;
 the first switching line and the second source-drain layer are disposed in a same layer.

In some embodiments, the touch connection line further includes a second switching line located in the switching region and located in the same layer as the trace; a projection of the second switching line on the substrate is located within the projection of the hollow portion on the substrate and located outside the projection of the trace on the substrate;
 an end of the second switching line is electrically connected to the touch signal line, the other end of the second switching line is electrically connected to the first switching line, and the first switching line is electrically connected to the touch signal line through the second switching line.

In some embodiments, the second switching line and the trace are located in a same layer, and the second switching line is a part separated from the trace when the hollow portions are formed on the trace.

In some embodiments, the touch connection line includes a first switching line, which is located in the switching region;
 the first switching line includes a first sub-switching line and a second sub-switching line, the first sub-switching line is located between the substrate and the trace, and the second sub-switching line is located between the trace and the touch signal line; and the touch signal line is electrically connected to the first sub-switching line and the second sub-switching line;
 hollow portions are disposed on the trace and the hollow portions are hollow parts of the trace; the second sub-switching line is electrically connected to the first sub-switching line and the touch signal line; and a projection of a part of the second sub-switching line in electrical connection with the first sub-switching line on the substrate and a projection of a part of the second sub-switching line in electrical connection with the touch signal line on the substrate each are located within a projection of a hollow portion of the hollow portions on the substrate, and located outside the projection of the trace on the substrate.

In some embodiments, the touch display panel further includes a bending region, where the bending region is located at a side of the switching region away from the touch region and parts distributed in the bending region are configured to bend to a non-light-emitting side of the touch display panel; the touch display panel further includes a touch transmission line which is partially located in the bending region and electrically connected to the touch connection line;
 the touch transmission line and the trace are located in a same layer.

In some embodiments, the touch display panel further includes a first gate layer, a second gate layer, a first source-drain layer, a second source-drain layer and an encapsulation layer that are sequentially stacked on the substrate;
 the touch signal line is located at a side of the encapsulation layer away from the substrate, where the trace and the first source-drain layer are located in a same layer;
the storage capacitor includes first gate layer and second gate layer that are opposite to each other, and the first gate layer is located between the second gate layer and the substrate;
 the first switching line is disposed in a same layer as the first gate layer or the second gate layer, and the second sub-switching line is disposed in a same layer as the second source-drain layer.

In some embodiments, the touch connection line further includes a second switching line which is located in the switching region and located in the same layer as the trace; a projection of the second switching line on the substrate is located within the projection of the hollow portion on the substrate and located outside the projection of the trace on the substrate;
 the second switching line is electrically connected to the first sub-switching line and the second sub-switching line; the second switching line is further electrically connected to the touch signal line, and the first sub-switching line and the second sub-switching line are electrically connected to the touch signal line through the second switching line.

In some embodiments, the second switching line and the trace are located in a same layer, and the second switching line is a part separated from the trace when the hollow portions are formed on the trace.

In some embodiments, the touch display panel further includes a dam located between the touch signal line and the trace; the touch signal line includes a first signal line portion and a second signal line portion; a projection of the first signal line portion on the substrate is located outside the projection of the trace on the substrate, and a projection of the second signal line portion on the substrate is located within the projection of the trace on the substrate; a boundary of the projections of the first signal line portion and the second signal line portion on the substrate is located within a projection of the dam on the substrate.

In some embodiments, the touch display panel further includes a first gate layer, a second gate layer, a first source-drain layer, a second source-drain layer and an encapsulation layer that are sequentially stacked on the substrate;

the touch signal line is located at a side of the encapsulation layer away from the substrate, wherein the trace and the first source-drain layer or the second source-drain layer are disposed in a same layer.

According to a second aspect of embodiments of the present disclosure, there is provided a display apparatus, including the touch display panel of any one of the above embodiments.

It will be understood that the above general description and subsequent detailed descriptions are merely illustrative and explanatory rather than limiting of the present disclosure.

BRIEF DESCRIPTION OF THE DRAWINGS

The drawings herein which are incorporated in and constitute a part of the specification illustrate embodiments consistent with the present disclosure and serve to explain the principle of the present disclosure together with the specification.

DETAILED DESCRIPTION

Exemplary embodiments will be described in detail herein, with the illustrations thereof represented in the drawings. When the following descriptions involve the drawings, like numerals in different drawings refer to same or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Figure 1:
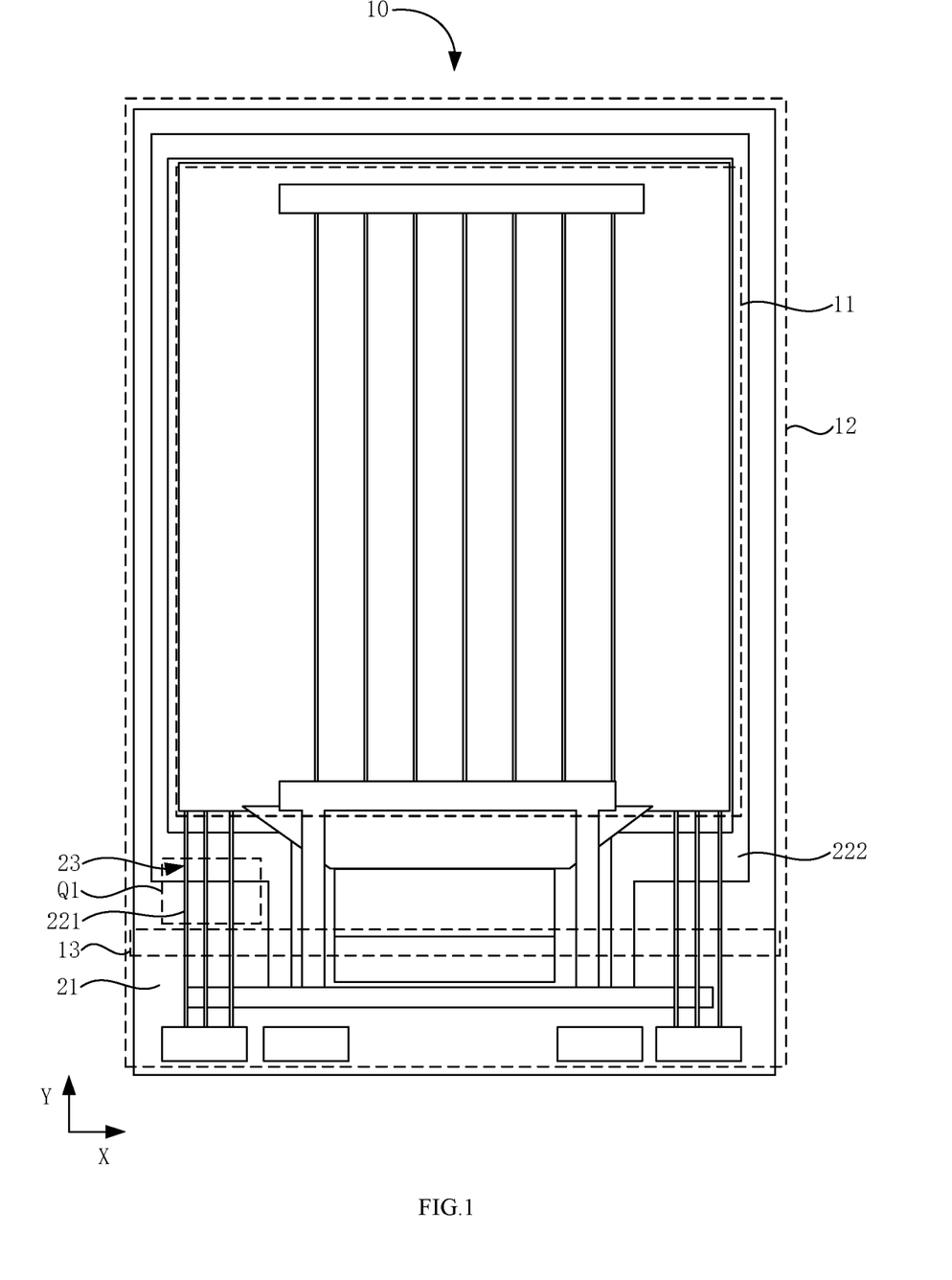
FIG. 1 is a schematic diagram illustrating a touch display panel according to some embodiments of the present disclosure.

Some embodiments of the present disclosure provide a touch display panel 10. As shown in FIG. 1, the touch display panel 10 includes a touch region 11, a switching region 12 and a bending region 13. The touch region 11 is adjacent to the switching region 12. Specifically, the switching region 12 surrounds the touch region 11, and the bending region 13 is located at a side of the switching region 12 away from the touch region 11. Parts distributed in the bending region 13 are configured to bend to a non-light-emitting side of the touch display panel 10. A light-emitting structure (not shown) is disposed in the touch region 11, and the touch region 11 of the touch display panel 10 may be used to display an image.

Figure 2:
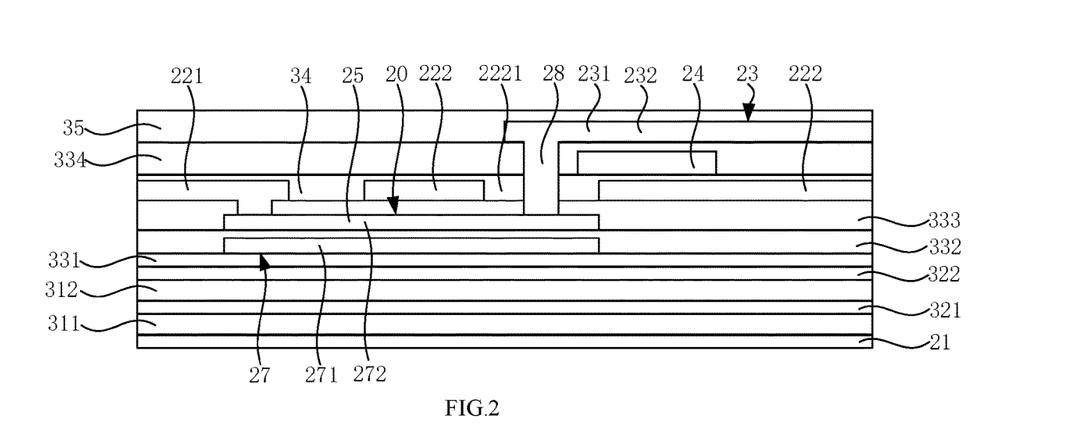
FIG. 2 is a partial view illustrating another touch display panel according to some embodiments of the present disclosure.

FIG. 2 is a partially enlarged view of the part Q1 in FIG. 1. As shown in FIG. 2, the touch display panel 10 further includes a substrate 21, a first gate layer 271, a second gate layer 272, a touch connection line 20, a touch transmission line 221, a trace 222, and a touch signal line 23. The substrate 21 is distributed in the touch region 11 and the switching region 12. The trace 222 is distributed in the switching region 12 and located on the substrate 21. The first gate layer 271 is located between the trace 222 and the substrate 21, and the second gate layer 272 is located between the first gate layer 271 and the trace 222. The touch transmission line 221 is located at a side of the trace 222 away from the touch region 11, and partially located in the bending region 13. Thus, it is the touch transmission line 221 that is mainly distributed in the bending region 13. Hence, it may be possible to avoid that electrically-connected parts between components are located in the bending region 13, and short-circuited due to abnormal contact resulting from a force applied to the electrically-connected parts in a case where the touch display panel 10 is bent. The touch signal line 23 is distributed in the touch region 11 and the switching region 12 and located at a side of the trace 222 away from the substrate 21. The touch connection line 20 is electrically connected with the touch transmission line 221 and also electrically connected with the touch signal line 23. The touch transmission line 221 is used to transmit a signal of the touch signal line 23 received by the touch connection line 20 to other elements of the touch display panel 10, for example, to a drive chip of the touch display panel 10, and this is not limited herein. Meanwhile, the touch transmission line 221 and the trace 222 may be located in a same layer, and this is not limited herein. The touch transmission line 221 and the trace 222 may be located in different layers. Further, in a direction perpendicular to the substrate 21, the touch connection line 20 is overlapped with at least partial edge of the trace 222. Specifically, a connection hole 28 is disposed between the touch signal line 23 and the touch transmission line 221, and the touch signal line 23 is electrically connected to the touch transmission line 221 through the connection hole 28. It is noted that other components may also be electrically connected through a connection hole 28. An insulation material is filled between the touch signal line 23 and the trace 222.

As shown in FIG. 2, the touch display panel 10 further includes a first flexible backplate layer 311, a second flexible backplate layer 312, a first blocking layer 321, a second blocking layer 322, a first insulation layer 331, a second insulation layer 332, a third insulation layer 333, a fourth insulation layer 334, a passsivation layer 34, and a glass cover 35. The fourth insulation layer 334 is located between the glass cover 35 and the trace 222, and the touch signal line 23 is located between the glass cover 35 and the fourth insulation layer 334. The fourth insulation layer 334 may be an encapsulation layer on which the touch signal line 23 is located. The touch signal line 23 may include a plurality of first signal lines (not shown) extending in a first direction X, and a plurality of second signal lines (not shown) extending in a second direction Y, where the first direction X intersects with the second direction Y. Specifically, an included angle between the first direction X and the second direction Y may be a right angle. The passivation layer 34 is located at a side of the fourth insulation layer 334 proximate to the substrate 21, and a dam 24 is located between the fourth insulation layer 334 and the passivation layer 34. The third insulation layer 333 is located at a side of the passivation layer proximate to the substrate 21, and the trace 222 is located between the passivation layer 34 and the third insulation layer 333. The second insulation layer 332 is located at a side of the third insulation layer 333 proximate to the substrate 21. The first insulation layer 331 is located at a side of the second insulation layer 332 proximate to the substrate 21. The second blocking layer 322 is located at a side of the first insulation layer 331 proximate to the substrate 21. The second flexible backplate layer 312 is located at a side of the second blocking layer 322 proximate to the substrate 21. The first blocking layer 321 is located at a side of the second flexible backplate layer 312 proximate to the substrate 21. The first blocking layer 321 and the second blocking layer 322 may be made of a same material as the first insulation layer 331, the second insulation layer 332, the third insulation layer 333 and the fourth insulation layer 334, for example, all may be made of an inorganic material, for example, silicon dioxide or silicon nitride, but not limited thereto. The first flexible backplate layer 311 is located at a side of the first blocking layer 321 proximate to the substrate 21. The first flexible backplate layer 311 and the second flexible backplate layer 312 each have support effect on the touch display panel 10. Since the display panel 10 may be applied to a use scenario such as a flexible display, flexible support performance of the flexible backplayer layer may be improved by disposing two flexible backplate layers so as to achieve good support effect on the touch display panel 10. In some embodiments, a number of the flexible backplate layers is not limited hereto, for example, one flexible backplate layer may be disposed, or three flexible backplate layers may be disposed. When one or more flexible backplate layers are disposed, one blocking layer is disposed at a side of each flexible backplate layer proximate to the first insulation layer 331. With the first blocking layer 321 and the second blocking layer 322, water vapor and oxygen may be better blocked from entering the touch display panel 10. Meanwhile, the second blocking layer 322 may also have an effect of maintaining a flatness of a surface of the second blocking layer 322 away from the second flexible backplate layer 312. The first insulation layer 331 and the second insulation layer 332 may be gate insulation layers, and the third insulation layer 333 may be a dielectric insulation layer. It is to be noted that, although not shown in FIG. 2, a first source-drain layer is also disposed between the passivation layer 34 and the third insulation layer 333; a second source-drain layer is also disposed at a side of the fourth insulation layer 334 proximate to the substrate 21; the trace 222 and the first source-drain layer may be disposed in a same layer or the trace 222 and the second source-drain layer may be disposed in a same layer.

In the related arts, due to unavoidable process fluctuation during manufacture of the trace 222, the trace 222 may be subjected to abnormalities such as uneven thickness, or incorrect tilt angle at edge. Thus, anomaly may easily occur to an edge of the passivation layer 34 during formation of the passivation layer 34, such that an effect of wrapping the trace 222 by the passivation layer 34 is poor. Furthermore, anomaly may also occur when the touch signal line 23 is manufactured at a corresponding position subsequently. It is to be noted that, the formation anomaly of the passivation layer 34 may easily occur at the edge of the trace 222, but such problem may also occur at other parts of the trace 222. Since the touch signal line 23 is relatively long and is to cross the trace 222 to face toward an edge of the touch transmission line 221, the touch signal line 23 crossing a part of the trace 222 poorly wrapped by the passivation layer 34 may easily be in abnormal contact with the trace 222, leading to large-area short-circuiting of the abnormally-contacted part. Therefore, in some embodiments, the touch transmission line 221 may be electrically connected to the touch signal line 23 through the touch connection line 20, so as to shorten a length of the touch signal line 23. With the shorter length of the touch signal line 23, anti-bending capability of the touch signal line 23 may be improved. Thus, it may be possible to avoid that after the touch signal line 23 is bent, contact between the touch signal line 23 and the part of the trace 222 poorly wrapped by the passivation layer results in short-circuiting. Furthermore, with the length of the touch signal line 23 shortened, the touch signal line may stay away from the part where the formation anomaly of the passivation layer 34 may easily occur at the edge of the trace 222. In this way, it may be possible to avoid that contact between the touch signal line 23 and the part of the trace 222 poorly wrapped by the passivation layer 34 results in the short-circuiting. Since the short-circuiting resulting from abnormal contact between the touch signal line 23 and the trace 222 is avoided by the above improvements, it may be possible to avoid the short-circuiting between the touch signal line 23 and the trace 222, and an influence on other adjacent touch signal lines 23 caused by the short-circuiting between the touch signal line 23 and the trace 222. Further, since the touch connection line 20 itself has a support effect, the touch connection line 20 may apply a support effect to the touch signal line 23, and thus help avoid the bending of the touch signal line 23.

Figure 3:
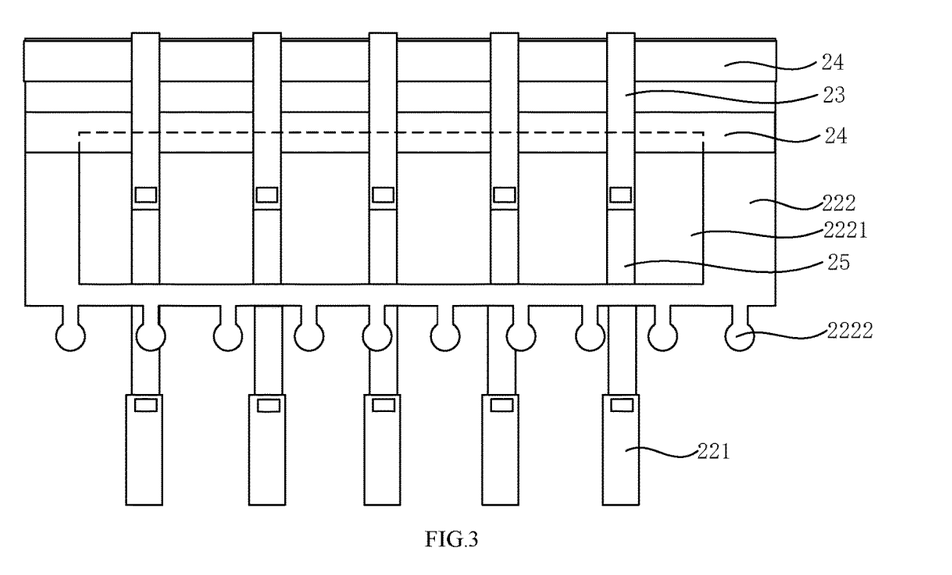
FIG. 3 is a top view of a touch panel according to some embodiments of the present disclosure.

In some embodiments, as shown in FIG. 2, the touch connection line 20 further includes a first switching line 25. The first switching line 25 is located in the switching region 12 and located between the substrate 21 and the trace 222. FIG. 3 is a top view showing an electrical connection relationship of the major structures in FIG. 2. As shown in FIGS. 2 and 3, hollow portions 2221 and protruding portions 2222 are disposed on the trace 222, where the hollow portions 2221 are hollow parts of the trace 222 and the protruding portions 2222 are protruding parts of the edge of the trace 222. The protruding portions 2222 may extend a path along which water vapor and oxygen enters the trace 222, and thus, water vapor and oxygen entering the trace 222 may be reduced. It will be noted that the protruding portions 2222 shown in FIG. 3 are only protruding portions 2222 of a partial edge of the trace 222, and the protruding portions 2222 may also be disposed at edges of the trace 222 in other directions. The first switching line 25 is electrically connected to the touch signal line 23. A projection of a part of the first switching line 25 in electrical connection with the touch signal line 23 on the substrate 21 is located within a projection of the hollow portion 2221 on the substrate 21.

The first switching line 25 is further electrically connected to the touch transmission line 221 and the touch transmission line 221 is electrically connected to the touch signal line 23 through the first switching line 25. Within the hollow portion 2221, an insulation material may be filled. Specifically, the insulation material may be an inorganic material, and this is not limited herein. In this way, the touch transmission line 221 may be electrically connected to the touch signal line 23 through the first switching line 25. Thus, it may be possible to avoid the abnormal contact between the trace 222 and the touch signal line 23 resulting from process fluctuation. Further, it may be possible to avoid the short-circuiting between the touch signal line 23 and the trace 222, and the influence on the other adjacent touch signal lines 23 caused by the short-circuiting between the touch signal line 23 and the trace 222. Furthermore, when the hollow portions 2221 are formed on the trace 222, since a space of the trace 222 is sufficient, resistance of the trace 222 will not be affected while the hollow portions are formed. As a result, when the hollow portions 2221 are formed, the display effect of the touch display panel 10 will not be affected.

Figure 4:
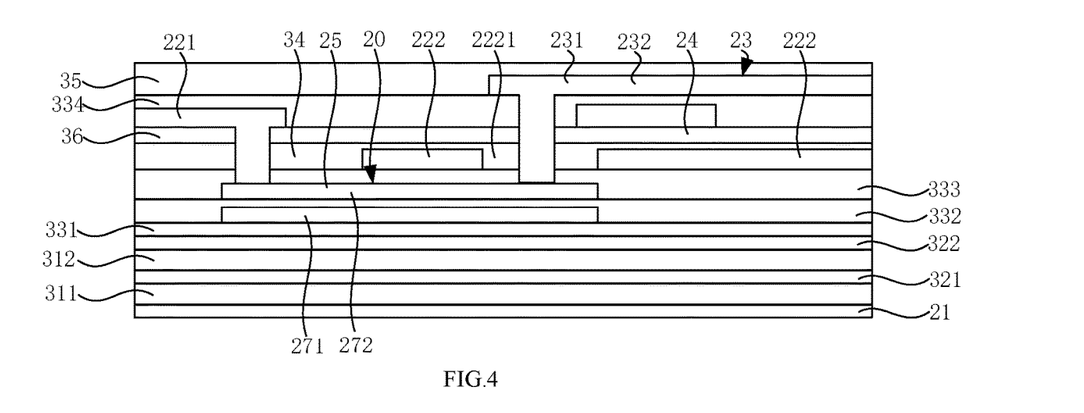
FIG. 4 is a partial view illustrating another touch display panel according to some embodiments of the present disclosure.

In some embodiments, as shown in FIG. 4, a planarization layer 36 is also disposed between the passivation layer 34 and the fourth insulation layer 334, and the touch transmission line 221 is located between the planarization layer 36 and the fourth insulation layer 334. The planarization layer 36 may maintain a flatness of a side away from the passivation layer 34, and meanwhile, the planarization layer 36 may also be used to guarantee insulation between other traces in the same layer as the touch transmission line 221, and other traces in the same layer as the trace 222. The touch transmission line 221 and the trace 222 may be located in a same layer or different layers. It is to be pointed out that, since the electrical connections of the major structures are similar, the top view of the electrical connection relationship of the major structures shown in FIG. 4 may be referred to FIG. 3. In this way, the touch transmission line 221 is not limited to being located in the same layer as the trace 222. Thus, the relationship between the touch transmission line 221 and the trace 222 may be extended and the application scenarios of the solutions may be expanded.

Figure 5:
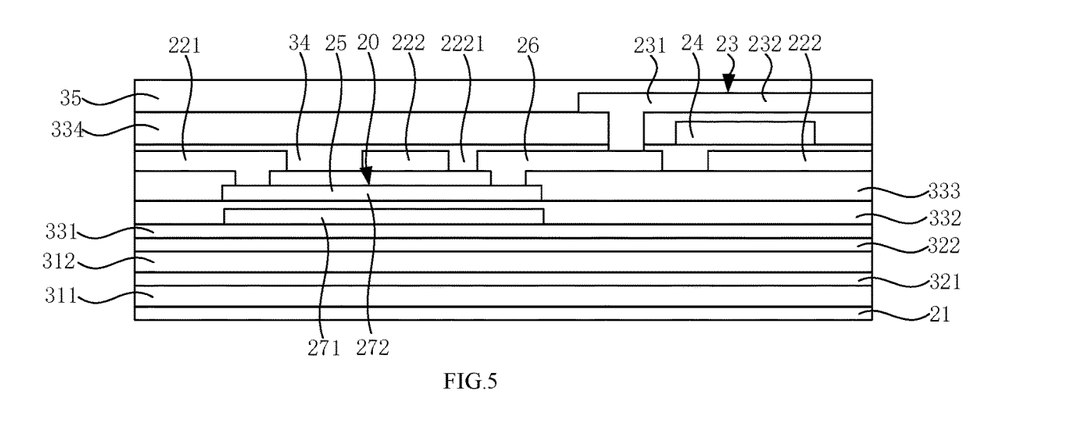
FIG. 5 is a partial view illustrating another touch display panel according to some embodiments of the present disclosure.
Figure 6:
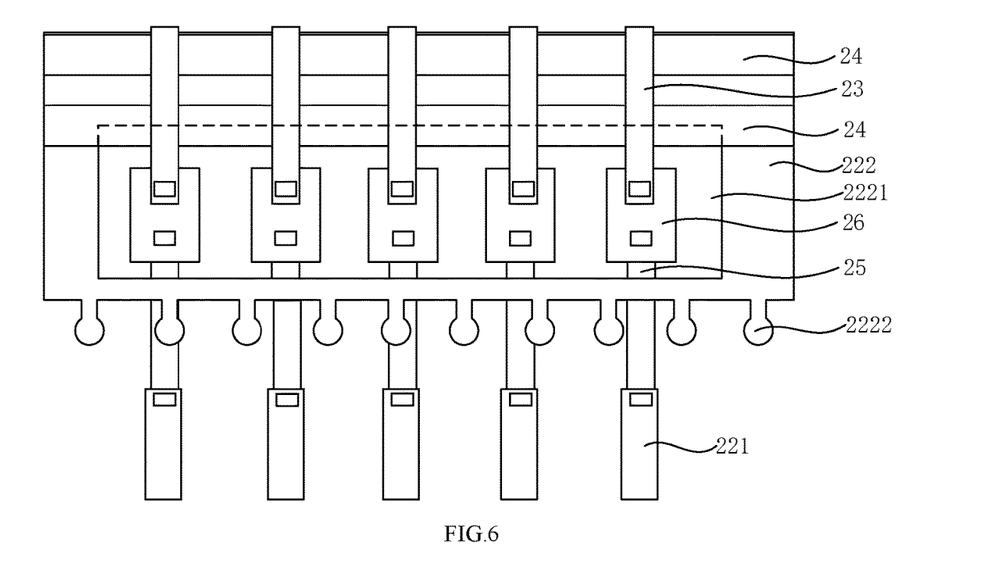
FIG. 6 is a top view of another touch panel according to some embodiments of the present disclosure.

In some embodiments, as shown in FIG. 5, the touch connection line 20 further includes a second switching line 26. The second switching line 26 is located in the switching region 12 and located in the same layer as the trace 222. FIG. 6 is a top view showing an electrical connection relationship of the major structures in FIG. 5. As shown in FIGS. 5 and 6, a projection of the second switching line 26 on the substrate 21 is located within the projection of the hollow portion 2221 on the substrate 21, and located outside the projection of the trace 222 on the substrate 21. An end of the second switching line 26 is electrically connected with the touch signal line 23 and the other end of the second switching line 26 is electrically connected to the first switching line 25. The first switching line 25 is electrically connected to the touch signal line 23 through the second switching line 26. In this way, the touch transmission line 221 is electrically connected to the touch signal line 23 through the first switching line 25 and the second switching line 26. The part easily subjected to abnormal contact is the part of the second switching line 26 in electrical connection with the touch signal line 23. Even if abnormal contact occurs, since the second switching line 26 itself needs to be electrically connected with the touch signal line 23, no short-circuiting will occur. Thus, it may be possible to avoid the abnormal contact between the trace 222 and the touch signal line 23 resulting from the process fluctuation, and thus the short-circuiting between the touch signal line 23 and the trace 222, and the influence on the other adjacent touch signal lines 23 caused by the short-circuiting between the touch signal line 23 and the trace 222. Since the first switching line 25 is electrically connected to the touch signal line 23 through the second switching line 26, compared with a manner that the first switching line 25 is directly electrically connected to the touch signal line 23, it may be possible to avoid manufacturing a long connection hole 28 to directly and electrically connect the first switching line 25 with the touch signal line 23. Further, the resistance increased due to the long connection hole 28 is reduced. It will be pointed out that, although in FIG. 5, the touch transmission line 221 and the trace 222 each are located between the passivation layer 34 and the third insulation layer 333, this is not limited herein. In some embodiments, by referring to the difference between the solutions shown in FIGS. 2 and 4, a planarization layer 36 may also be disposed between the passivation layer 34 and the fourth insulation layer 334 in FIG. 5, and the touch transmission line 221 is located between the planarization layer 36 and the fourth insulation layer 334.

In some embodiments, as in the solution shown in FIG. 5, the second switching line 26 is a part separated from the trace 222 when the hollow portions 2221 are formed on the trace 222. In this way, parts on the trace 222 can be removed as few as possible. Therefore, it may be possible to further avoid that the display effect of the touch display panel 10 is affected due to excessive removal of the parts on the trace 222, thereby improving the utilization rate of the material. Further, it is not required to manufacture the second switching line 26 with additional other materials, thus simplifying the process and reducing the costs.

Figure 7:
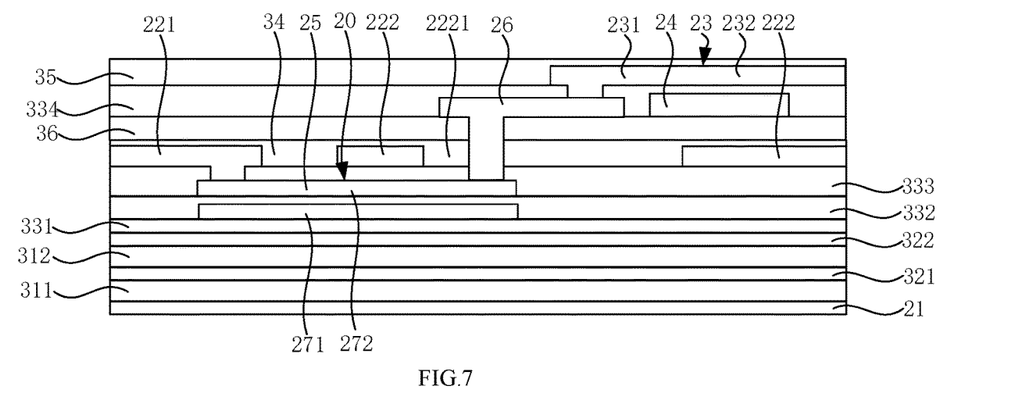
FIG. 7 is a partial view illustrating another touch display panel according to some embodiments of the present disclosure.

In some embodiments, as shown in FIG. 7, the second switching line 26 and the trace 222 are located in different layers. Specifically, the second switching line 26 is located between the trace 222 and the touch signal line 23. The projection of the second switching line 26 on the substrate 21 is located within the projection of the hollow portion 2221 on the substrate 21 and located outside the projection of the trace 222 on the substrate 21. An end of the second switching line 26 is electrically connected with the touch signal line 23, and the other end of the second switching line 26 is electrically connected to the first switching line 25. The first switching line 25 is electrically connected to the touch signal line 23 through the second switching line 26. It will be pointed out that, since the electrical connections of the major structures are similar, the top view of the electrical connection relationship of the major structures shown in FIG. 7 may be referred to FIG. 6. In this way, the touch transmission line 221 is electrically connected to the touch signal line 23 through the first switching line 25 and the second switching line 26. The part easily subjected to abnormal contact is the part of the second switching line 26 in electrical connection with the touch signal line 23. Even if abnormal contact occurs, since the second switching line 26 itself needs to be electrically connected with the touch signal line 23, no short-circuiting will occur. Thus, it may be possible to avoid the abnormal contact between the trace 222 and the touch signal line 23 resulting from the process fluctuation, and thus the short-circuiting between the touch signal line 23 and the trace 222, and the influence on the other adjacent touch signal lines 23 caused by the short-circuiting between the touch signal line 23 and the trace 222. Since the first switching line 25 is electrically connected to the touch signal line 23 through the second switching line 26, compared with the manner that the first switching line 25 is directly and electrically connected to the touch signal line 23, it may be possible to avoid manufacturing a long connection hole 28 to directly and electrically connect the first switching line 25 with the touch signal line 23. Further, the resistance increased due to the long connection hole 28 is reduced. It will be pointed out that, as shown in FIG. 7, although the touch transmission line 221 is located between the passivation layer 34 and the third insulation layer 333, and the trace 222 is located between the planarization layer 36 and the fourth insulation layer 334, this is not limited herein. In some embodiments, the touch transmission line 221 and the trace 222 each may be located between the planarization layer 36 and the fourth insulation layer 334.

In some embodiments, as in the solution shown in FIG. 7, although not shown in FIG. 7, a second source-drain layer is disposed between the planarization layer 36 and the fourth insulation layer 334. The second switching line 26 and the second source-drain layer are disposed in a same layer. During the manufacturing of the second source-drain layer located in the same layer as the second switching layer 26, the second switching line 26 may be formed at the same time. In this way, it is not required to manufacture the second switching line 26 with additional other materials, thus simplifying the process and reducing the costs.

Figure 8:
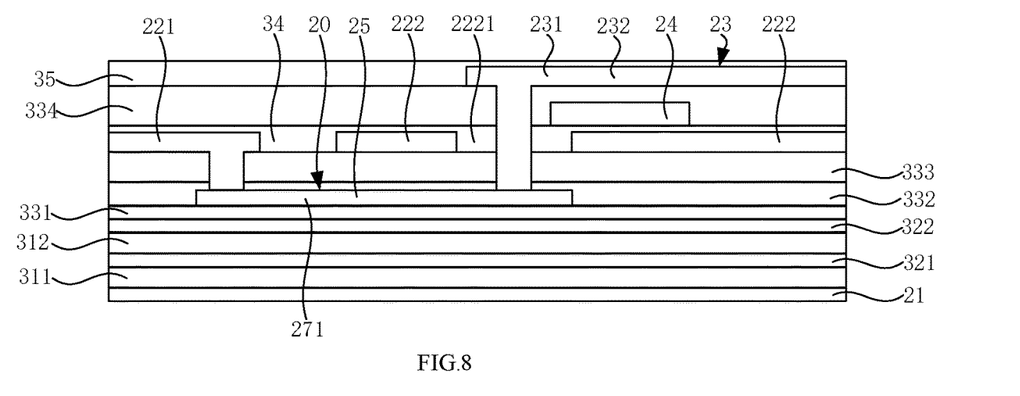
FIG. 8 is a partial view illustrating another touch display panel according to some embodiments of the present disclosure.
Figure 9:
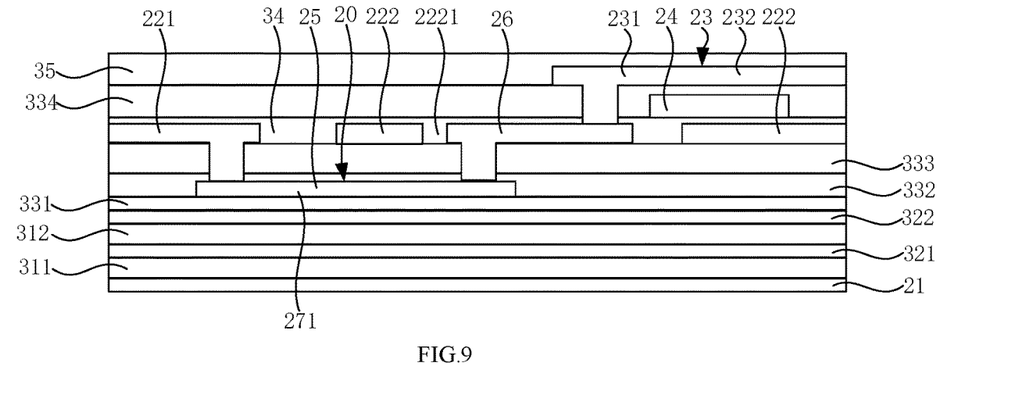
FIG. 9 is a partial view illustrating another touch display panel according to some embodiments of the present disclosure.

In some embodiments, as shown in FIGS. 2, 4, 5 and 7, the touch display panel 10 further includes a storage capacitor 27 which is located between the substrate 21 and the trace 222. The storage capacitor 27 includes first gate layer 271 and second gate layer 272 that are opposite to each other. The first gate layer 271 is located between the second gate layer 272 and the substrate 21. Specifically, the storage capacitor 27 may be a capacitor in a thin film transistor of the touch display panel 10. The first switching line 25 is the first gate layer 271 or the second gate layer 272. As shown in FIGS. 2, 4, 5 and 7, the first switching line 25 and the second gate layer 272 are disposed in a same layer. As shown in FIGS. 8 and 9, corresponding to the solutions shown in FIGS. 2 and 5, the first switching line 25 and the first gate layer 271 are disposed in a same layer. Furthermore, the case shown in FIGS. 8 and 9 is only illustrative. In some embodiments, the first switching line in the above other solutions also may be located in the same layer as the first gate layer 271. Since the electrical connections of the major structures are similar, the top views of the electrical connection relationship of the major structures shown in FIGS. 8 and 9 may be referred to the above drawings. In this way, it is not required to manufacture the first switching line 25 with additional other materials, thus simplifying the process and reducing the costs.

Figure 10:
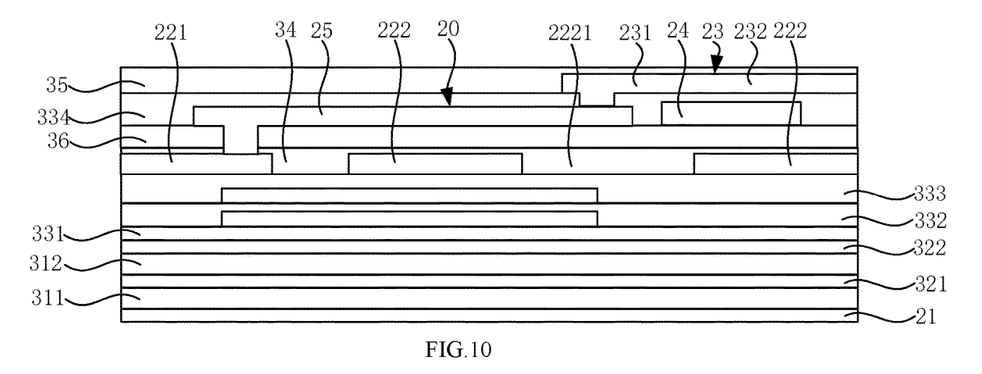
FIG. 10 is a partial view illustrating another touch display panel according to some embodiments of the present disclosure.

In some embodiments, as shown in FIG. 10, the first switching line 25 is located between the planarization layer 36 and the fourth insulation layer 334. The first switching line 25 is electrically connected to the touch signal line 23, and a projection of a part of the first switching line 25 in electrical connection with the touch signal line 23 on the substrate 21 is located within the projection of the hollow portion 2221 on the substrate 21. The first switching line 25 is further electrically connected to the touch transmission line 221, and the touch transmission line 221 is electrically connected to the touch signal line 23 through the first switching line 25. In this way, the touch transmission line 221 is electrically connected to the touch signal line 23 through the first switching line 25, it may be possible to avoid the abnormal contact between the trace 222 and the touch signal line 23 resulting from the process fluctuation, and thus the short-circuiting between the touch signal line 23 and the trace 222, and the influence on the other adjacent touch signal lines 23 caused by the short-circuiting between the touch signal line 23 and the trace 222. When the hollow portions 2221 are formed on the trace 222, since the space of the trace 222 is sufficient, the resistance of the trace 222 will not be affected while the hollow portions are formed. As a result, when the hollow portions 2221 are formed, the display effect of the touch display panel 10 will not be affected.

In some embodiments, as in the solution shown in FIG. 10, although not shown in FIG. 10, a second source-drain layer is disposed between the planarization layer 36 and the fourth insulation layer 334. The first switching line 25 and the second source-drain layer are disposed in a same layer. During manufacturing of other metal traces located in the same layer as the first switching layer 25, the first switching line 25 may be formed at the same time. In this way, it is not required to manufacture the first switching line 25 with additional other materials, thus simplifying the process and reducing the costs.

Figure 11:
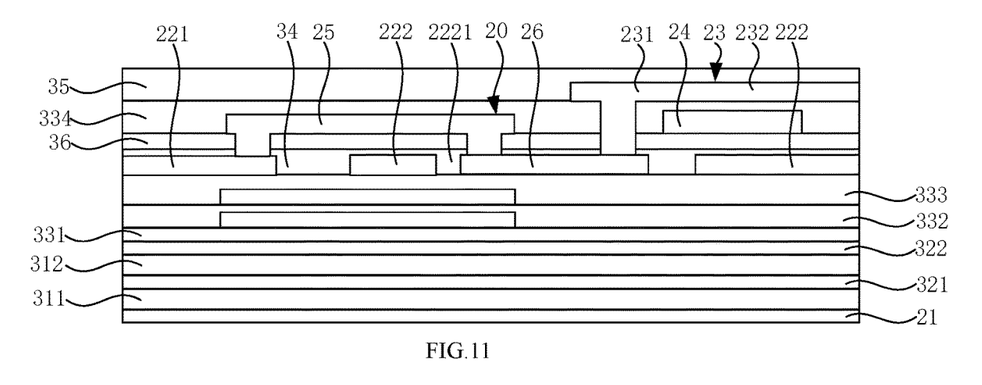
FIG. 11 is a partial view illustrating another touch display panel according to some embodiments of the present disclosure.

In some embodiments, as shown in FIG. 11, the second switching line 26 and the trace 222 are located in a same layer. The projection of the second switching line 26 on the substrate 21 is located within the projection of the hollow portion 2221 on the substrate 21 and located outside the projection of the trace 222 on the substrate 21. An end of the second switching line 26 is electrically connected with the touch signal line 23, and the other end of the second switching line 26 is electrically connected to the first switching line 25. The first switching line 25 is electrically connected to the touch signal line 23 through the second switching line 26. In this way, the touch transmission line 221 is electrically connected to the touch signal line 23 through the first switching line 25 and the second switching line 26. The part easily subjected to abnormal contact is the part of the second switching line 26 in electrical connection with the touch signal line 23. When abnormal contact occurs, since the second switching line 26 itself needs to be electrically connected with the touch signal line 23, no short-circuiting will occur. Thus, it may be possible to avoid the abnormal contact between the trace 222 and the touch signal line 23 resulting from the process fluctuation, and thus the short-circuiting between the touch signal line 23 and the trace 222, and the influence on the other adjacent touch signal lines 23 caused by the short-circuiting between the touch signal line 23 and the trace 222.

In some embodiments, the second switching line 26 is a part separated from the trace 222 when the hollow portions 2221 are formed on the trace 222. In this way, parts on the trace 222 may be removed as few as possible. Therefore, it may be possible to avoid that the display effect of the touch display panel 10 is affected due to excessive removal of the parts on the trace 222, thereby improving the utilization rate of the material. Further, since the first switching line 25 is located between the planarization layer 36 and the fourth insulation layer 334, to avoid short-circuiting, more parts on the trace 222 is to be removed. Therefore, it is more important to remove parts on the trace 222 as few as possible in this solution, and the effect of avoiding affecting the touch display panel 10 will be better. Further, it is not required to manufacture the second switching line 26 with additional other materials, thus simplifying the process and reducing the costs.

Figure 12:
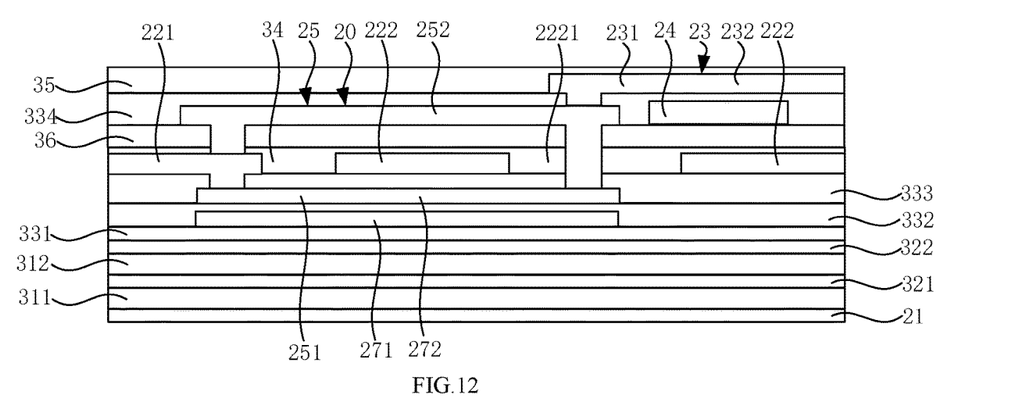
FIG. 12 is a partial view illustrating another touch display panel according to some embodiments of the present disclosure.

In some embodiments, as shown in FIG. 12, the first switching line 25 includes a first sub-switching line 251 and a second sub-switching line 252. The first sub-switching line 251 is located between the substrate 21 and the trace 222, and the second sub-switching line 252 is located between the planarization layer 36 and the fourth insulation layer 334. The touch transmission line 221 is electrically connected to the first sub-switching line 251 and the second sub-switching line 252. The touch transmission line 221 is electrically connected to the first sub-switching line 251 and the second sub-switching line 252, and the second sub-switching line 252 is electrically connected to the first sub-switching line 251 and the touch signal line 23. A projection of a part of the second sub-switching line 252 in electrical connection with the first sub-switching line 251 on the substrate 21 and a projection of a part of the second sub-switching line 252 in electrical connection with the touch signal line 23 on the substrate 21 each are located within the projection of the hollow portion 2221 on the substrate 21, and located outside the projection of the trace 222 on the substrate 21. The touch transmission line 221 is electrically connected to the touch signal line 23 through the first sub-switching line 251 and the second sub-switching line 252. In this way, the touch transmission line 221 is electrically connected to the touch signal line 23 through the first sub-switching line 251 and the second sub-switching line 252. Thus, it may be possible to avoid the abnormal contact between the trace 222 and the touch signal line 23 resulting from the process fluctuation. Further, it may be possible to avoid the short-circuiting between the touch signal line 23 and the trace 222, and the influence on other adjacent touch signal lines 23 caused by the short-circuiting between the touch signal line 23 and the trace 222. Furthermore, when the hollow portions 2221 are formed on the trace 222, since the space of the trace 222 is sufficient, the resistance of the trace 222 will not be affected while the hollow portions are formed. As a result, when the hollow portions 2221 are formed, the display effect of the touch display panel 10 will not be affected. Since the touch transmission line 221 is electrically connected to the touch signal line 23 through two paths, the first sub-switching line 251 and the second sub-switching line 252, and the first sub-switching line 251 and the second sub-switching line 252 are equivalent to being parallel-connected in a circuit, thus the resistance of the circuit may be reduced.

In some embodiments, as shown in FIG. 12, although not shown in FIG. 12, a second source-drain layer is disposed between the planarization layer 36 and the fourth insulation layer 334. The second sub-switching line 252 and the second source-drain layer are disposed in a same layer. The first sub-switching line 251 is disposed in the same layer as the first gate layer 271 or the second gate layer 272.

Figure 13:
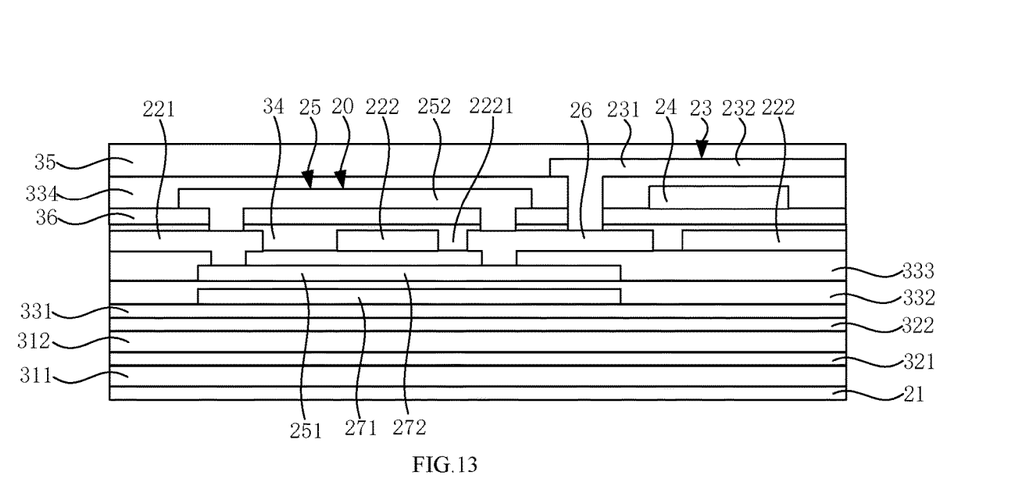
FIG. 13 is a partial view illustrating another touch display panel according to some embodiments of the present disclosure.

In some embodiments, as shown in FIG. 13, the second switching line 26 and the trace 222 are located in a same layer. An end of the second switching line 26 is electrically connected to the first sub-switching line 251 and the second sub-switching line 252, and the other end of the second switching line 26 is electrically connected to the touch signal line 23. The first sub-switching line 251 and the second sub-switching line 252 are electrically connected to the touch signal line 23 through the second switching line 26. In this way, the touch transmission line 221 is electrically connected to the touch signal line 23 through the first switching line 25 and the second switching line 26. The part easily subjected to abnormal contact is the part of the second switching line 26 in electrical connection with the touch signal line 23. Even if abnormal contact occurs, since the second switching line 26 itself needs to be electrically connected with the touch signal line 23, no short-circuiting will occur. Thus, it may be possible to avoid the abnormal contact between the trace 222 and the touch signal line 23 resulting from the process fluctuation, and thus the short-circuiting between the touch signal line 23 and the trace 222, and the influence on the other adjacent touch signal lines 23 caused by the short-circuiting between the touch signal line 23 and the trace 222. Since the first switching line 25 is electrically connected to the touch signal line 23 through the second switching line 26, compared with the manner that the first sub-switching line 251 and the second sub-switching line 252 are directly and electrically connected to the touch signal line 23, it may be possible to avoid manufacturing a long connection hole 28 to directly and electrically connect the first switching line 25 with the touch signal line 23. Further, the resistance increased due to the long connection hole 28 is reduced.

In some embodiments, as shown in FIG. 13, the second switching line 26 may also be a part separated from the trace 222 when the hollow portions 2221 are formed on the trace 222.

In some embodiments, the touch display panel 10 further includes a dam 24 located between the touch signal line 23 and the trace 222. The touch signal line 23 includes a first signal line portion 231 and a second signal line portion 232. A projection of the first signal line portion 231 on the substrate 21 is located outside the projection of the trace 222 on the substrate 21, and a projection of the second signal line portion 232 on the substrate 21 is located within the projection of the trace 222 on the substrate 21. A boundary of the projections of the first signal line portion 231 and the second signal line portion 232 on the substrate 21 is located within a projection of the dam 24 on the substrate 21. Further, the dam 24 is closer to the connection hole 28 than the trace 222. In this way, by blocking the touch signal line 23 from contacting with the trace 222 at the edge of the trace 222 through the dam 24, it may be possible to avoid the short-circuiting resulting from abnormal contact between the touch signal line 23 and the trace 222. Thus, it may be possible to avoid the short-circuiting between the touch signal line 23 and the trace 222, and the influence on the other adjacent touch signal lines 23 caused by the short-circuiting between the touch signal line 23 and the trace 222.

Some embodiments of the present disclosure further provide a display apparatus including any one of the above touch display panels 10.

The above embodiments of the present disclosure can be mutually supplemented in case of no conflicts.

It will be noted that in the accompanying drawings, for illustration clarity, the sizes of the layers and regions may be exaggerated. Furthermore, it may be understood that when an element or layer is referred to as being "on" another element or layer, such element or layer may be directly on the another element or layer or there is an intermediate layer therebetween. Further, it is understood that when an element or layer is referred to as being "under" another element or layer, such element or layer may be directly under the another element or layer, or one or more intermediate elements or layers are present therebetween. In addition, it may also be understood that when a layer or element is referred to as being between two layers or elements, such layer or element may be a sole layer between the two layers or elements, or one or more intermediate layers or elements are present. Like reference signs in the descriptions indicate like elements.

The term "plural" refers to two or more unless otherwise stated clearly.

Other implementations of the present disclosure will be apparent to a person skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A touch display panel, comprising a touch region and a switching region, the touch region and the switching region being adjacent to each other, and the touch region being provided with a light emitter;
wherein the touch display panel comprises:
a substrate;
a trace, wherein at least part of the trace is located in the switching region on the substrate;
a touch signal line, located at a side of the trace away from the substrate;
a touch connection line, electrically connected to the touch signal line, and disposed in a different layer from the trace and the touch signal line; wherein in a direction perpendicular to the substrate, the touch connection line is overlapped with at least partial edge of the trace;
wherein the touch connection line comprises a first switching line located in the switching region and located between the substrate and the trace;
hollow portions are disposed on the trace and the hollow portions are hollow parts of the trace; the first switching line is electrically connected to the touch signal line, and a projection of a part of the first switching line in electrical connection with the touch signal line on the substrate is located within a projection of a hollow portion of the hollow portions on the substrate.

2. The touch display panel according to claim 1, further comprising a bending region, wherein the bending region is located at a side of the switching region away from the touch region, and parts distributed in the bending region are configured to bend to a non-light-emitting side of the touch display panel; the touch display panel further comprises a touch transmission line which is partially located in the bending region and in electrical connection with the touch connection line.

3. The touch display panel according to claim 2, wherein the touch transmission line and the trace are located in a same layer; or the touch transmission line and the trace are located in different layers.

4. The touch display panel according to claim 1, wherein the touch connection line further comprises a second switching line which is located in the switching region; a projection of the second switching line on the substrate is located within the projection of the hollow portion on the substrate and outside the projection of the trace on the substrate;
an end of the second switching line is electrically connected to the touch signal line, other end of the second switching line is electrically connected to the first switching line, and the first switching line is electrically connected to the touch signal line through the second switching line.

5. The touch display panel according to claim 4, wherein the second switching line and the trace are located in a same layer, and the second switching line is a part separated from the trace when the hollow portions are formed on the trace; or the second switching line and the trace are located in different layers.

6. The touch display panel according to claim 4, further comprising a first gate layer, a second gate layer, a first source-drain layer, a second source-drain layer and an encapsulation layer that are sequentially stacked on the substrate;
the touch signal line is located at a side of the encapsulation layer away from the substrate, wherein the trace and the first source-drain layer are disposed in a same layer;
the second switching line and the second source-drain layer are disposed in a same layer.

7. The touch display panel according to claim 1, further comprising: a storage capacitor, located between the substrate and the trace; wherein the storage capacitor comprises first gate layer and second gate layer that are opposite to each other, and the first gate layer is located between the second gate layer and the substrate;
the first switching line is disposed in a same layer as the first gate layer or the second gate layer.

8. The touch display panel according to claim 1, wherein the touch connection line further comprises a first switching line located in the switching region;
the first switching line is located between the touch signal line and the trace; the trace is provided with hollow portions which are hollow parts of the trace; the first switching line is electrically connected to the touch signal line, and a projection of a part of the first switching line in electrical connection with the touch signal line on the substrate is located within the projection of a hollow portion of the hollow portions on the substrate.

9. The touch display panel according to claim 8, further comprising a bending region, wherein the bending region is located at a side of the switching region away from the touch region and parts distributed in the bending region are configured to bend to a non-light-emitting side of the touch display panel; the touch display panel further comprises a touch transmission line which is partially located in the bending region and electrically connected to the touch connection line;
the touch transmission line and the trace are located in a same layer.

10. The touch display panel according to claim 8, further comprising a first gate layer, a second gate layer, a first source-drain layer, a second source-drain layer and an encapsulation layer that are sequentially stacked on the substrate;
the touch signal line is located at a side of the encapsulation layer away from the substrate, wherein the trace and the first source-drain layer are located in a same layer;
the first switching line and the second source-drain layer are disposed in a same layer.

11. The touch display panel according to claim 8, wherein the touch connection line further comprises a second switching line located in the switching region; a projection of the second switching line on the substrate is located within the projection of the hollow portion on the substrate and located outside the projection of the trace on the substrate;
an end of the second switching line is electrically connected to the touch signal line, other end of the second switching line is electrically connected to the first switching line, and the first switching line is electrically connected to the touch signal line through the second switching line.

12. The touch display panel according to claim 11, wherein the second switching line and the trace are located in a same layer, and the second switching line is a part separated from the trace when the hollow portions are formed on the trace.

13. The touch display panel according to claim 1, wherein the touch connection line comprises a first switching line, which is located in the switching region;
the first switching line comprises a first sub-switching line and a second sub-switching line, the first sub-switching line is located between the substrate and the trace, and the second sub-switching line is located between the trace and the touch signal line; and the touch signal line is electrically connected to the first sub-switching line and the second sub-switching line;
hollow portions are disposed on the trace and the hollow portions are hollow parts of the trace; the second sub-switching line is electrically connected to the first sub-switching line and the touch signal line; and a projection of a part of the second sub-switching line in electrical connection with the first sub-switching line on the substrate a projection of a part of the second sub-switching line in electrical connection with the touch signal line on the substrate each are located within a projection of a hollow portion of the hollow portions on the substrate, and located outside the projection of the trace on the substrate.

14. The touch display panel according to claim 13, further comprising a bending region, wherein the bending region is located at a side of the switching region away from the touch region and parts distributed in the bending region are configured to bend to a non-light-emitting side of the touch display panel; the touch display panel further comprises a touch transmission line which is partially located in the bending region and electrically connected to the touch connection line;
the touch transmission line and the trace are located in a same layer.

15. The touch display panel according to claim 13, further comprising a first gate layer, a second gate layer, a first source-drain layer, a second source-drain layer and an encapsulation layer that are sequentially stacked on the substrate;
the touch display panel further includes a storage capacitor, the touch signal line is located at a side of the encapsulation layer away from the substrate, wherein the trace and the first source-drain layer are located in a same layer; the storage capacitor comprises first gate layer and second gate layer that are opposite to each other, and the first gate layer is located between the second gate layer and the substrate;
the first switching line is disposed in a same layer as the first gate layer or the second gate layer, and the second sub-switching line is disposed in a same layer as the second source-drain layer.

16. The touch display panel according to claim 13, wherein the touch connection line further comprises a second switching line which is located in the switching region; a projection of the second switching line on the substrate is located within the projection of the hollow portion on the substrate and located outside the projection of the trace on the substrate;
the second switching line is electrically connected to the first sub-switching line and the second sub-switching line; the second switching line is further electrically connected to the touch signal line, and the first sub-switching line and the second sub-switching line are electrically connected to the touch signal line through the second switching line.

17. The touch display panel according to claim 16, wherein the second switching line and the trace are located in a same layer, and the second switching line is a part separated from the trace when the hollow portions are formed on the trace.

18. The touch display panel according to claim 1, further comprising: a dam located between the touch signal line and the trace; the touch signal line comprises a first signal line portion and a second signal line portion; a projection of the first signal line portion on the substrate is located outside the projection of the trace on the substrate, and a projection of the second signal line portion on the substrate is located within the projection of the trace on the substrate; a boundary of the projections of the first signal line portion and the second signal line portion on the substrate is located within a projection of the dam on the substrate.

19. A display apparatus, comprising a touch display panel-the touch display panel, comprising a touch region and a switching region, the touch region and the switching region being adjacent to each other, and the touch region being provided with a light emitter;
wherein the touch display panel comprises:
a substrate;
a trace, wherein at least part of the trace is located in the switching region on the substrate;
a touch signal line, located at a side of the trace away from the substrate;
a touch connection line, electrically connected to the touch signal line, and disposed in a different layer from the trace and the touch signal line; wherein in a direction perpendicular to the substrate, the touch connection line is overlapped with at least partial edge of the trace;
wherein the touch connection line comprises a first switching line located in the switching region and located between the substrate and the trace;
hollow portions are disposed on the trace and the hollow portions are hollow parts of the trace; the first switching line is electrically connected to the touch signal line, and a projection of a part of the first switching line in electrical connection with the touch signal line on the substrate is located within a projection of a hollow portion of the hollow portions on the substrate.

20. A touch display panel, comprising a touch region and a switching region, the touch region and the switching region being adjacent to each other, and the touch region being provided with a light emitter;
wherein the touch display panel comprises:
a substrate;
a trace, wherein at least part of the trace is located in the switching region on the substrate;
a touch signal line, located at a side of the trace away from the substrate;
a touch connection line, electrically connected to the touch signal line, and disposed in a different layer from the trace and the touch signal line; wherein in a direction perpendicular to the substrate, the touch connection line is overlapped with at least partial edge of the trace;
wherein the touch connection line further comprises a first switching line located in the switching region;

the first switching line is located between the touch signal line and the trace; the trace is provided with hollow portions which are hollow parts of the trace; the first switching line is electrically connected to the touch signal line, and a projection of a part of the first switching line in electrical connection with the touch signal line on the substrate is located within the projection of a hollow portion of the hollow portions on the substrate.

\* \* \* \* \*